C. J. SHIRREFF.
Car-Movers.

No. 149,348.   Patented April 7, 1874.

Witnesses  
John L. Barry  
John I. Gilbert

Inventor.  
Charles James Shirreff

UNITED STATES PATENT OFFICE.

CHARLES J. SHIRREFF, OF MALONE, NEW YORK.

IMPROVEMENT IN CAR-MOVERS.

Specification forming part of Letters Patent No. 149,348, dated April 7, 1874; application filed October 4, 1873.

*To all whom it may concern:*

Be it known that I, CHARLES J. SHIRREFF, of Malone, Franklin county, State of New York, have invented a Bar for Moving by Hand a Locomotive-Engine, of which the following is a specification:

The object of this invention is to move a locomotive-engine with less power than is required to move the same engine with any other bar.

Figure 1:
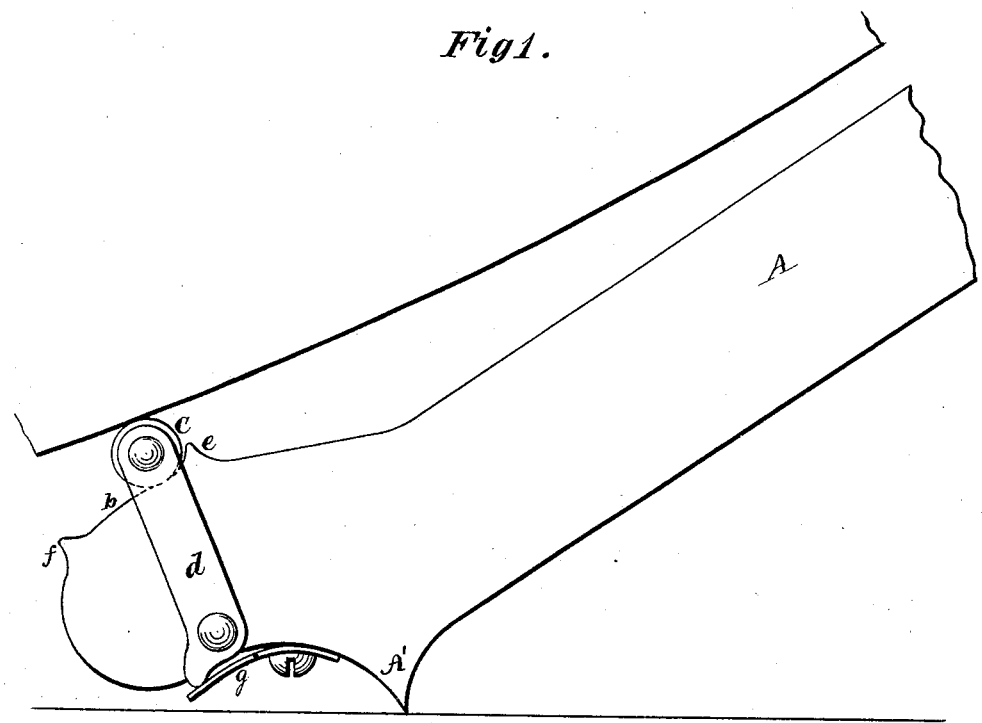
Figure 2:
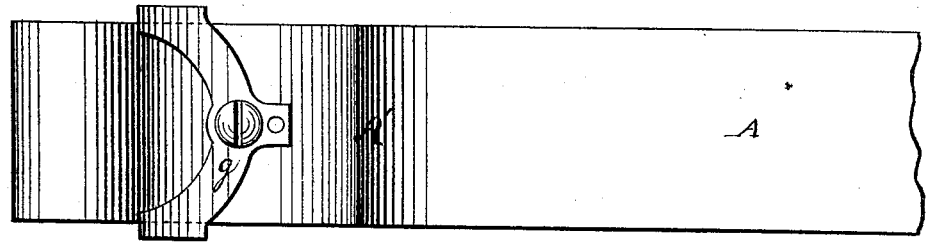

Figure 1 is a side view. Fig. 2 is a top view.

The working part is made of steel. Five inches up from the point it is welded to a piece of round iron one and a half inch in diameter and ten inches long. To this is welded a tube three feet and nine inches in length, and tapering from one and a half inch to one inch in diameter. This forms the handle. The entire length of the bar A is five feet. The heel A', the upper surface $b$, and the roller $c$ are of hardened steel. The roller $c$ is held in its place by the arms $d$.

When the bar is placed under the wheel to be moved, and the handle is forced down, the roller $c$ will move forward from the check $e$ to the check $f$, until relieved by lifting the handle; then the spring $g$ at the bottom will throw the roller back to the check $e$, ready to act again when the bar is moved forward to the wheel.

This bar can be used without the roller by cutting away the cheek-plates $d$ $d$.

The advantages are, that, even without the roller, there is less friction than in any other locomotive pinch-bar known to me, while, with the roller, friction is almost entirely obviated. Hence the weight of the bar is about one-third less than that of any other bar used for the same purpose, and is a great saving of power, both in moving and operating this bar as compared with any other.

What I claim is—

The device for moving locomotives, consisting of the bar A, having the heel A', cheek-plates $d$, roller-surface $b$, roller C, and spring $g$, as and for the purpose set forth.

CHARLES JAMES SHIRREFF.

Signed in our presence:
 JOHN I. GILBERT,
 MILO B. GOODELL.